United States Patent [19]

van Steenbrugge et al.

[11] Patent Number: 5,249,182

[45] Date of Patent: Sep. 28, 1993

[54] COMMUNICATION BUS SYSTEM WITH LOCK/UNLOCK CAPABILITY

[75] Inventors: Bernard van Steenbrugge; Henricus F. A. de Leeuw, both of Eindhoven, Netherlands

[73] Assignee: U.S. Philips Corporation, New York, N.Y.

[21] Appl. No.: 903,593

[22] Filed: Jun. 24, 1992

Related U.S. Application Data

[63] Continuation of Ser. No. 316,722, Feb. 28, 1989, Pat. No. 5,128,936, which is a continuation-in-part of Ser. No. 286,575, Dec. 19, 1988, Pat. No. 4,937,816.

[30] Foreign Application Priority Data

Mar. 16, 1988 [NL] Netherlands ............... 8800639

[51] Int. Cl.$^5$ ............................... H04J 3/14
[52] U.S. Cl. ..................... 370/85.2; 340/825.07; 340/825.5
[58] Field of Search .......... 370/85.1, 85.2, 85.6, 370/92, 94.1, 110.1; 340/825.06, 825.07, 825.5, 825.51, 825.52

[56] References Cited

U.S. PATENT DOCUMENTS

| | | | |
|---|---|---|---|
| 4,429,384 | 1/1984 | Kaplinsky | 307/85.1 |
| 4,715,031 | 12/1987 | Crawford et al. | 370/85.6 |
| 4,750,176 | 6/1988 | van Veldhuizen | 370/85.1 |
| 4,779,089 | 10/1988 | Theus | 370/85.6 |
| 4,787,033 | 11/1988 | Bomba et al. | 370/85.6 |
| 4,818,985 | 4/1989 | Ikeda | 370/85.6 |
| 4,937,816 | 6/1990 | van Steenbrugge et al. | 370/85.6 |
| 5,003,536 | 3/1991 | Tanaka et al. | 340/825.5 |
| 5,031,175 | 7/1991 | Tanaka et al. | 370/85.1 |
| 5,128,936 | 7/1992 | van Steenbrugge et al. | 370/85.6 |

Primary Examiner—Douglas W. Olms
Assistant Examiner—Melvin Marcelo
Attorney, Agent, or Firm—Anne E. Barschall

[57] ABSTRACT

A multi-station communication bus system allows for the use of several master stations by way of an arbitration organization. A message contains a master address which is subjected to an arbitration operation, a slave address with space for a slave address acknowledge bit, a control signal with space for a control acknowledge bit, and one or more data bytes. Per data byte an indication of the "last" byte is also transmitted and space is reserved for a data acknowledge bit. When a data acknowledge bit is not correctly received, the data byte in question is repeated until at the most the maximum frame length is reached. The remainder of a message is then placed in a next frame. If an address or control acknowledge bit is not correctly received, the relevant frame is terminated. In case of a plurality of bytes in a message, the first frame thereof has a lock control signal that is activated upon communication of at least one data byte. Moreover, the last byte of the message is put in a separate frame that has an unlock control signal which is activated upon communication of the last byte.

11 Claims, 1 Drawing Sheet

COMMUNICATION BUS SYSTEM WITH LOCK/UNLOCK CAPABILITY

This is a continuation of application Ser. No. 07/316,722, filed on Feb. 28, 1989, which is a continuation-in-part of Ser. No. 07/286,575, filed on Dec. 19, 1988, U.S. Pat. Nos. 5,128,936 and 4,937,816, respectively.

BACKGROUND OF THE INVENTION

The invention relates to a multi-station communication bus system having at least one master station and at least one slave station, any master station comprising arbitration means per frame for transmitting an arbitration signal, and for detecting a negative or positive arbitration result, depending an arbitration signal of any other station. The master station also comprises transmission means for transmitting a message after a positive arbitration result. The frame comprises a slave station address with a slave control signal, followed by a series of data byte spaces up to a predetermined maximum number per frame, each time with signalling of a "last/non-last" data byte of said message and space for the directly subsequent communication of a data byte acknowledge signal. A system of this kind is known from Netherlands Patent Application 8002345 and the corresponding U.S. Pat. Specification No. 4,429,384 (PHN 9737). The reference relates to a single-channel system; however, the invention is just as useful in a more extensive system, for example with a separate clock wire. The bus may be galvanic; it can alternatively be realized by optical means. The arbitration means are effective in that the bus realizes a wired logic function, for example a wired AND-function. This can be done by means of an open collector connection of the stations and the like: each station supplying a logic O then masks any logic 1 delivered by any other station. The operation is the same in the case of an optical system.

The known system is well-defined at the bit level, but does not describe the actions to be undertaken when one of two communicating stations is incapable of correctly processing the information applied to it in case of multi-byte messages.

SUMMARY OF THE INVENTION

Among other things, it is an object of the invention to provide simple adaptations for enabling the control of the information stream between the transmitter station and the receiver station so that a high degree of certainty exists that the information is correctly received. It is also an object that in the case of errors upon reception, advantagous steps are taken in order to realize effective transmission by a suitable choice between deactivation/repetition of the data. It is also an object especially in case of a multi-byte message, to ensure that the receiver has correctly received all parts of such message. The objects are achieved according to one of the aspects of the invention in that a plurality of data bytes to be communicated as a unit is signalled by a control signal indicating a lock state, the last byte of the plurality being communicated in a separate frame. The control signal of the frame indicates an unlock stage. Each data byte is repeated until reception of a positive acknowledge signal therefor. The slave station so addressed executes any lock/unlock operation upon reception of the associated lock/unlock control signal, respectively, in combination with at least one data byte communicated correctly in the associated frame. The lock mechanism provides the slave station as privileged communication partner to the master: if the slave is operating as receiver in this communication, it will receive the data bytes of the message correctly, and in the correct sequence, without any byte of any possible other message in between. Of course, after the termination of a frame, the master thereof can lose a subsequent arbitration operation but the other winning master cannot address the slave-receiver because it is still locked with respect to the incomplete message. A similar situation exists with the slave transmitter. The provision of a separate frame for the last byte ensures maximum probability for correct detection of the unlocking. It should be clear that a slave that would not detect an unlocking control would effectively thereafter be lost to the communication operation, without execution of a higher-level stratagem. Correct detection of the unlock control plus a correct communication of the last message byte raises the probability for correct operation to a very high value.

The invention also relates to a transmitter station and to a receiver station for use in such system. Further attractive aspects are described in the dependent Claims.

BRIEF DESCRIPTION OF THE FIGURES

The invention will now be described in detail hereinafter with reference to some Figures. Therein

DESCRIPTION OF A PREFERRED EMBODIMENT

Figure 1:
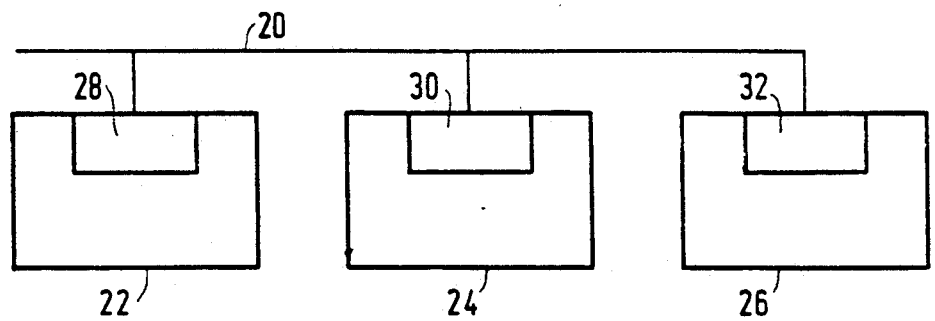
FIG. 1 is a general representation of a single-channel communication bus system.

FIG. 1 is a general representation of a single-channel communication bus system. Line 20 represents the channel, for example a twisted pair of conductors. There are three stations 22, 24, 26, each of which comprises a respective interface circuit 28, 30, 32. The stations may be of various complexities. Field of application may include, for example communicating control signals between apparatus and facilities in a house or apartment. Apparatus of this kind may be simple or complex, for example a television receiver, an audio recorder, a washing machine, a microwave oven, a central timer, a sensor for ambient temperature/solar radiation, control circuitry for air treatment, or an illumination (sub)system. The invention does not relate to the functions of these apparatus. For controlling this function, sometimes a local control system will be present comprising a microcomputer, sensors, drivers, A/D, D/A converters, a memory, I/O equipment. This equipment will not be described for the sake of simplicity. Some apparatus will act as a master station vis à vis the bus, and other apparatus as a slave station. Some apparatus act as transmitters of data, and some apparatus as receivers. Furthermore, a variety of mixed or alternating situations can occur. The operations described below take place on the communication bus system and are executed by the interface circuits.

DESCRIPTION OF THE BUS PROTOCOL

Figure 2:
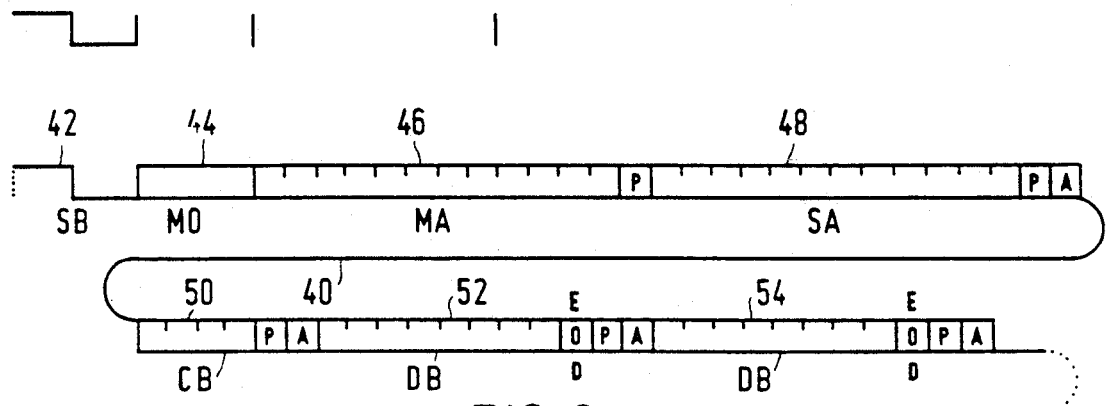
FIG. 2 shows the structure of a communication operation.

FIG. 2 shows the structure of a communication operation at the data level. For the form of data bits and other bits, reference is had to the citation. The Figure shows the time axis as a meandering line 40 along which the bit cells are assumed to be arranged in a contiguous manner. The reference numeral 42 indicates the start bit. The reference numeral 44 concerns the mode indication which indicates the bit rate at which subsequently data is to be transmitted; this involves 3 bits at the most. A limited number of standardized transmission frequencies have been defined. The reference numeral 46 indicates the address of the relevant master station. This address contains 12 bits, followed by a parity bit P. An arbitration operation is performed on the mode indication, and on the master address. For the mode choice the lowest (=slowest) mode prevails. For the addresses the station having the highest priority prevails. The mode indication and master address together constitute a priority signal. After the transmission of the master address, only one master station remains. This station subsequently transmits the slave address 48. This address contains 12 address bits, one parity bit P and space for an address acknowledge bit A. When a slave station recognizes its own address, it transmits an address acknowledge bit in the block A. When the latter bit is not received, the intended slave station is either absent or does not operate, or the address has an incorrect parity. No distinction is made between these three possibilities. In that case the frame shown in FIG. 2 is immediately terminated. When the acknowledgement by the slave station is correct, the master station transmits a control signal 50. This signal contains four control bits, one parity bit P and space for a control acknowledge bit A. The treatment of the P and A bits is identical to that in the case of the slave address. If the control acknowledge bit does not appear, the frame is directly terminated by the master station. When the acknowledgement by the slave station is correct, a data byte is transmitted (52). For the time being the description will be based on a master transmitter station. The data byte contains 8 bits, a signalling "last" data byte (EOD), one parity bit P and space for a data acknowledge bit A. The EOD signaling indicates whether the transmitter station considers the byte concerned as the last byte or as a non-last byte of the message. The frame length amounts to at the most 2 bytes in mode 0; in mode 1 it amounts to 32 bytes from (master station) or 16 bytes from (slave station); in the mode 2 it amounts to 128 bytes from (master station) or 64 bytes from (slave station), but shorter messages are also permissible. The parity bit P has the same function as previously described, but is determined also on the basis of the EOD bit. If the data acknowledge bit is not received, there may be a variety of reasons: a parity error, slave station deactivated since the reception of the control signal 50, or slave station incapable of receiving and buffering the data byte, for example because the processing of the data had taken too much time. In all these cases the master station is set to the repeat state. In this state the relevant data byte, including the facilities for EOD, P, A, is repeated until ultimately the data acknowledge bit is received. Then, if the relevant data byte was not the last byte, the repeat state is left and the next data byte is transmitted (for example 54). If, however, it was the last data byte, the frame and the message are terminated. Subsequently a new message/frame may commence. Each time, upon transmission of a data byte, a counter position is incremented. When the counter reaches the maximum frame length, or when the message is completed, the "last" data byte is indicated (the first one of the two limits occurring is decisive). The frame is terminated after the "last" byte. If the data acknowledge bit is not correctly received after the "last" byte, the "last" byte is repeated, for as long as it fits within the defined frame length. When the message has not yet been completed when the maximum frame length is reached, a new frame is started. The first data byte thereof is taken as the first not yet transmitted data byte of the message, or as the data byte for which no correct data acknowledge bit had yet been received. Consequently, this implies no double transmission of a data byte already transmitted successfully. Normally, the "lock" mechanism is used in this respect, so that the relevant slave remains reserved for the actual transmission. This will be described in detail hereinafter. According to this lock mechanism, another master station having a higher priority can meanwhile obtain the monopoly over the bus, but cannot gain access to the slave station that had been locked. This organization simplifies the procedure in the slave station (usually having a comparatively simple construction).

The described organization can also be used with a master receiver and slave transmitter organization. In as far as the data bytes and associated parity bits are concerned, the transmission direction is then reversed. This also holds for the transmission direction of the data acknowledge bits.

FURTHER ORGANIZATIONS

The master station can set/reset the lock flag at the slave by means of a given control signal, thus instructing the slave to listen only to the master station concerned. The slave station is unlocked by the master station when the latter transmits a 1-byte-data frame, containing the release or unlock command. The lock flag should be set/reset by the slave after at least 1 byte of the associated frame has been correctly transmitted/communicated.

A slave address acknowledge bit is not given if:
the slave is absent
the slave cannot handle the mode (speed) of the frame
a parity error occurs in the master address and/or slave address
timing is incorrect, causing bus errors, so that synchronization or parity errors occur.

The master responds to a negative address acknowledge bit by either
repeating the frame, possible in a lower mode
requesting the status for the relevant slave in the mode 0 (possibly repeatedly). The highest mode in which the slave can operate is derived from the status. Subsequently the message is repeated in the highest feasible mode.

When the transmission repeatedly stops at the negative slave address acknowledge bit, it must be concluded that the slave is absent. In that case further repetition does not make sense.

A control acknowledge bit is not given in the case of:
parity error
timing error
inability of the slave to execute the requested function.

The master may respond by repeating the message in first instance. If again no control acknowledge bit is received, it requests the master station at the slave in order to determine why it did not receive this acknowledge bit.

A negative data acknowledge bit is cause by:

parity error
timing error
full receiver buffer.

In the case of a parity error or in the case of a full receiver buffer, this byte will be repeated, as far as possible, until either the byte has been acknowledged or the frame length has been used up. If the byte has not been transmitted within the frame, a new frame will be initiated for this byte (and the next, if applicable) byte. Preferably, data bytes which have been successfully transmitted will not be repeated in such a new frame. As a result, the transport speed remains high.

The following control signals are defined: HEX 0 (0000): read the status of the interface circuit of the slave station. If this operation is not followed by an acknowledge signal, the conclusion is that the interface circuit of the slave station is defective. However, a repeat operation may be undertaken. The interface circuit of the master station will signal the defect to the control system of the master station (for example, one of the previously mentioned apparatus). If correct acknowledgement is received, the slave station subsequently outputs a data byte in which its status is shown. HEX 2 (0010): read the status and apply the lock signal to the slave station. When the slave station is locked by another master station, this circumstance is signalled in the data byte; the requesting master must attempt again; this is signalled to the control system of the master station. HEX 3 (0011): read data and apply the lock signal to the slave station. If no answer is received, the status is interrogated, which is specified as follows: bit 0=0: the transmitter buffer of the slave station is empty; this is signalled to the control system. bit 2=1: the slave station is locked by another station; the control system receives the instruction to attempt again. bit 4=0: the slave station cannot transmit data; this is signalled to the control system. In all other cases for the bits 0, 2, 4 a new frame is initiated with the same control code. HEX 4 (0100): read the two least-significant tetrades of the address whereto the slave station is locked. If the slave station is not locked, this fact is signalled to the control system of the master, by means of a negative acknowledge bit. HEX 5 (0101): ditto for the most-significant tetrade. HEX 6 (0110): read the status of the slave and unlock. If the slave station is locked by another master station, this is signalled by a negative acknowledge bit, and the master stops its attempt. However, the host or application may instruct the losing master to make a new attempt. HEX 7 (0111): read the data and unlock. Except for the unlock, this corresponds to the code 0011. HEX 8 (1000): write possession request; if a negative acknowledge bit ensues, a query for the properties/status of the slave station is made. The latter are interpreted as follows: bit 1=1: the receiver buffer of the slave is not empty; signal to the control system of the master station. bit 2=1: as above. bit 3=0: slave does not have a memory which means that the slave is not able to answer requests for property/status; this situation is static and is reported to the control system. If none of the three bits has a result, a new attempt is made. HEX A(1010): write command and lock. Subsequently the status is read, in case of a negative acknowledge bit, interpreted as follows: Bits 1, 2 as above; if none of these bits has a result, a new attempt is made. HEX B (1011): write data and lock. Subsequently the status is read, in case of a negative acknowledge bit; interpretation is same as with HEX A. HEX E (1110): write command and unlock; remainder is identical to A. HEX F (1111): write data and unlock; remainder is identical to A.

At the end of each frame the transmitting station (slave station or master station) checks whether all necessary bytes have been transmitted. If this is not the case, the master station starts a new frame and the transmitting station loads the remaining bytes into the local transmitter buffer.

DESCRIPTION OF AN INTERFACE CIRCUIT

Figure 3:
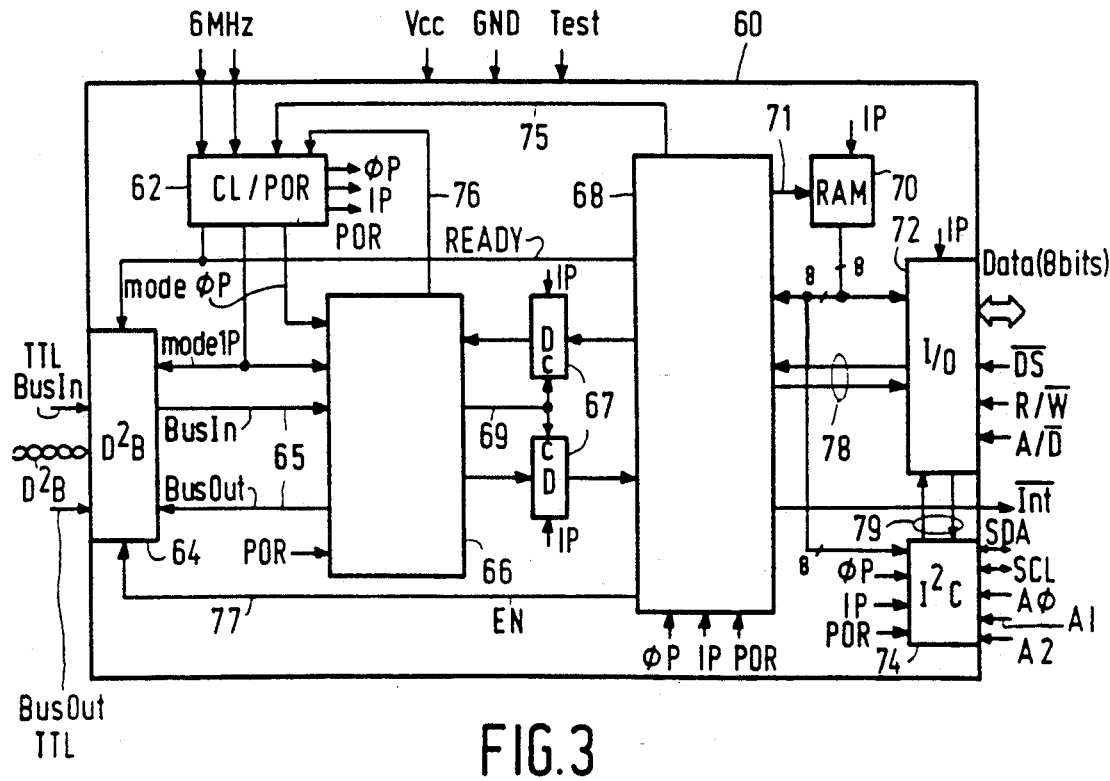
FIG. 3 shows an embodiment of an interface circuit.

FIG. 3 shows an embodiment of an interface circuit. The circuit (60) comprises the following connections, viewed clock-wise from the oscillator (6 MHz):

power supply VCC, ground GND, test control test, 8 bits data for the local control system, with a synchronization (strobe) pin $\overline{DS}$, read/write control $R/\overline{W}$, selection between address and data $(A/\overline{D})$, an interrupt signal Int, an $I^2C$ connection (in this case of no further importance), three preset address bits therefor ($A\phi$, A1, A2), two lines for data at the TTL level, and a twisted wire pair for the single-channel communication ($D^2B$) as described above. Element 62 comprises the clock and the control components for the resetting of the circuit when the supply voltage appears (POR=power-on reset). A "chip-ready" signal, the POR signal and the clock signals $\phi P$, 1P originate herefrom. The "chip-ready" signal indicates that the circuit is operational again after power on and reset.

Block 64 is a circuit for the filtering, detection and controlling of signals on the $D^2B$ and TTL lines. The data contents of the signals on $D^2B$ and TTL are identical, except for the following electrical differences: TTL is unidirectional versus $D^2B$ which is bidirectional, and the voltage levels differ. On lines 65 the line bits are transported at the TTL level. In block 66 a translation takes place between the line bits and the logic bits. The blocks 67 constitute two unidirectional latch circuits between the blocks 66 and 68. Line 69 carries a signal for activating the next bit. Block 68 constitutes the core of the interface circuit. Therein the parity bits are formed, the acknowledge bits are detected and the various control bits and status bits are analyzed or stored for interrogation, if any. Furthermore, the information is exchanged with the control system and the interaction with RAM buffer 70 is organized. Buffer 70 has a data width of 8 bits; the number of bytes is determined by the application. The addresses appear on line 71; block 72 is a data gate having a width of 8 bits for connection to the local control system (not shown). Block 74 is an interface unit for an $I^2C$ bus. The associated protocol is described in U.S. Pat. No. 4,689,740; for a proper understanding of the circuit, therefore, this $I^2C$ bus need not be further described. The signals mode $\phi P$, mode 1P are secondary clock signals having the same frequency as $\phi P$, 1P, or a frequency which is a factor 4 lower, depending on the operating mode on the external bus $D^2B$. Line 76 controls the switching over of the clock to the bit level (for the various bit lengths) which need not be the same for the start bit, mode/address/control bits and data bits. Line 75 has the same function at the frame level. Line 77 is an enable line (EN); lines 78 provide synchronization handshake, and so do the lines 79.

In a simple embodiment the circuit is suitable for use in the mode 0 and 1; moreover, it is suitable for master operation as well as slave operation. After a reset signal (power-on-reset, POR), the circuit is initialized. The microprocessor can make the address of the circuit available to the interface circuit by loading of some free-accessible registers. Moreover, some flag bits which indicate the capacities of the application are set (when a local memory is present and the slave station can also act as a transmitter). The signal POR also causes an interrupt signal for the local control system (usually a microprocessor). The bus status of the slave part of the circuit is stored in the slave status register. When the circuit is locked by another station, the address of the latter station is stored in the lock address register. In order to activate a circuit as a master station, the control circuit of the application should provide the following information:

the slave station address, the control code and, in the case of a write operation, the data bytes to be transmitted in order to be loaded into the master station buffer, the mode signal, indicating the line mode to be used, and the master station request signal are loaded into the master station command register.

The station subsequently initiates a message and participates, if necessary, in the relevant arbitration procedure. When the frame is terminated after a positive arbitration result, an interrupt signal for the local control system (INT) is given. The local control system can subsequently read the reason of the interrupt signal in the interrupt register (master interrupt, slave transmitter interrupt or slave receiver interrupt). The master status register contains the number of positive acknowledge bits and indicates whether the message was successful. The latter register thus acts as a counter. Moreover, after an interrupt signal in the case of a read operation, the master buffer contains the data received. The interrupt register is reset after having been read. This is effected by an explicit write operation in the register in question.

Virtually the same operations are performed for a slave receiver function. The number of positive acknowledge bits is then stored in the slave receiver register. When the slave receiver buffer has been read, the slave receiver command register is filled with the information 00 (HEX).

We claim:

1. A multi-station communication bus system having at least two master stations and at least one slave station, any master station comprising arbitration means per frame for transmitting an arbitration signal, and for detecting a negative or positive arbitration result, in dependence of an arbitration signal of any other station, and also comprising transmission means for transmitting a message after a positive arbitration result, wherein said frame comprises a slave station address cum slave control signal followed by a series of data byte spaces, up to a predetermined maximum number of data bytes per frame characterized in that a plurality of data bytes to be communicated as a unit is signalled by a control signal indicating a lock state, and in that the slave station so addressed executes a lock/unlock operation in relation to the master station upon reception of the associated lock/unlock control signal, respectively, such that after execution of a lock operation the slave station will not accept data bytes from a further master station before execution of a corresponding unlock operation, even when the further master station obtains a positive arbitration result.

2. A bus system as claimed in claim 1, wherein each data byte space is followed by space for the signalling of a data byte acknowledge signal and each byte is repeated until the reception of a positive acknowledge signal therefor.

3. A bus system as claimed in claim 2, wherein the slave station has validation means for in a receiver state validating a data byte correctly received, and executes a lock operation upon reception of a lock signal only in combination with at least one data byte received in the associated frame.

4. A bus system as claimed in claim 2, wherein the slave station has validation means for in a receiver state validating a data byte correctly received, and executes a lock operation upon reception of a lock signal only in combination with at least one data byte received correctly in the associated frame, the last byte of the said plurality being transmitted in a separate frame.

5. A bus system as claimed in claim 1, wherein each data byte space includes signalling of a "last/non-last" data byte of said message.

6. A bus system as claimed in claim 3, wherein the slave station has validation means for in a receiver state validating a data byte correctly received, and executes a lock operation upon reception of a lock signal only in combination with at least one data byte received correctly in the associated frame, the last byte of the said plurality being transmitted in a separate frame.

7. A bus system as claimed in claim 2, wherein each data byte space includes signalling of a "last/non-last" data byte of said message.

8. A bus system as claimed in claim 3, wherein each data byte space includes signalling of a "last/non-last" data byte of said message.

9. A bus system as claimed in claim 4, wherein each data byte space includes signalling of a "last/non-last" data byte of said message.

10. A bus system as claimed in claim 6, wherein each data byte space includes signalling of a "last/non-last" data byte of said message.

11. A multistation communication bus system comprising a) a plurality of master stations, at least one master station comprising
  i) arbitration means for transmitting an arbitration result for each frame and for detecting a negative or positive arbitration result depending on an arbitration signal from another station; and
  ii) transmission means for transmitting a message after a positive arbitration result, the frame including a slave address with a slave control signal followed by a series of data byte spaces, a plurality of data bytes to be communicated as a unit being signalled by a control signal indicating a lock state; and b) at least one slave station, addressed by the frame, for executing a lock or unlock operation in relation to a transmitting master station upon reception of the associated lock or unlock control signal, respectively, such that after execution of a lock operation the slave station will not accept data bytes from a further master station before execution of a corresponding unlock operation, even when the further master station obtains a positive arbitration result.

* * * * *